Figure 1:
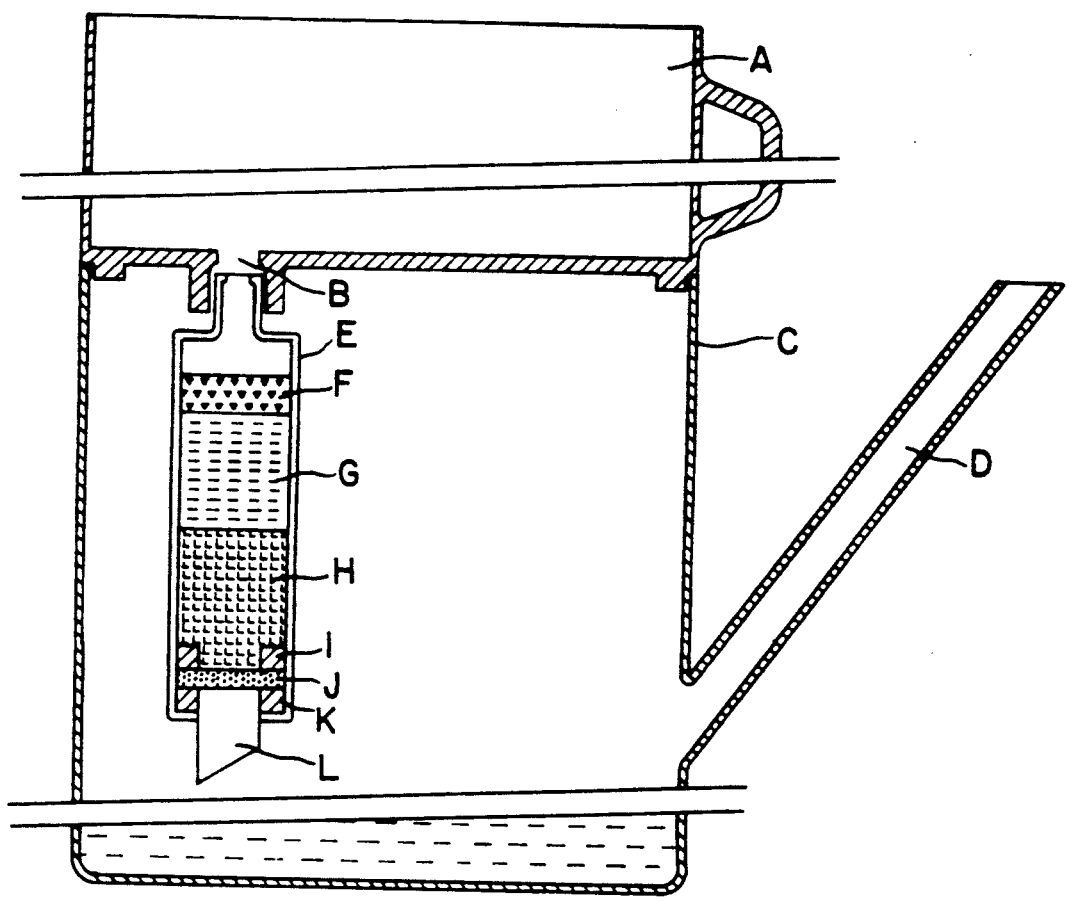

United States Patent [19]
Affonso

[11] Patent Number: 5,238,576
[45] Date of Patent: Aug. 24, 1993

[54] ION EXCHANGE DEVICE FOR PURIFYING WATER, PROCESS FOR MANUFACTURING IT AND ITS USE FOR REMOVING NITRATES AND/OR NITRATES FROM WATER

[76] Inventor: Alvaro Affonso, Rindschestiftstrasse 2, D-6380 Bad Homburg v.d.H., Fed. Rep. of Germany

[21] Appl. No.: 663,904

[22] Filed: Oct. 3, 1991

[30] Foreign Application Priority Data

Jul. 7, 1989 [DE] Fed. Rep. of Germany ....... 3922391

[51] Int. Cl.⁵ .............................................. C02F 1/42
[52] U.S. Cl. .................................. 210/684; 210/282; 210/284; 210/290
[58] Field of Search ................ 210/284, 290, 282, 684

[56] References Cited

U.S. PATENT DOCUMENTS

| | | | |
|---|---|---|---|
| 3,414,508 | 12/1968 | Applebaum et al. | 210/686 |
| 3,420,709 | 1/1969 | Barrett, Jr. et al. | 210/503 |
| 3,420,773 | 1/1969 | Selmeczi | 210/683 |
| 3,497,069 | 2/1970 | Lindenthal et al. | 210/282 |
| 3,664,506 | 5/1972 | Meunier et al. | 210/284 |
| 3,849,306 | 11/1974 | Anderson | 210/284 |
| 3,926,559 | 12/1975 | Stevens | 210/284 |
| 3,985,648 | 10/1976 | Casolo | 210/669 |
| 4,474,620 | 10/1984 | Hall | 210/257 |
| 4,479,877 | 10/1984 | Guter | 210/670 |
| 4,904,383 | 2/1990 | Auerswald | 210/269 |
| 5,062,957 | 11/1991 | Berreby | 210/903 |

FOREIGN PATENT DOCUMENTS

| | | |
|---|---|---|
| 249049 | 12/1987 | European Pat. Off. |
| 291330 | 11/1988 | European Pat. Off. |
| 3010538 | 11/1980 | Fed. Rep. of Germany |
| 8518951 | 12/1985 | Fed. Rep. of Germany |
| 3515299 | 10/1986 | Fed. Rep. of Germany |

Primary Examiner—Stanley S. Silverman
Assistant Examiner—Cynthia L. Nessler
Attorney, Agent, or Firm—Foley & Lardner

[57] ABSTRACT

The present invention relates to an ion exchange device for purifying water by reducing the nitrite and/or nitrate content, consisting of at least one container with a basic anion exchanger in chloride and/or sulphate form arranged therein and at least one additional basic anion exchanger layer in hydroxyl form or a hydroxyl-group-containing layer, in which the anion exchanger layers are arranged one behind the other directly and/or with the interposition of an intermediate layer and the anion exchange layer(s) in chloride and/or sulphate form is/are arranged not as a mixture but in (a) separate layer(s). The chloride and/or sulphate containing layer is arranged near or beneath the inlet aperture, preferably beneath the filter layer and/or (in the direction of flow of the water) in front of the anion exchange layer in the form of hydroxyl or containing hydroxyl groups. This invention also relates to processes for manufacturing and for using the ion exchange device to remove nitrates and/or nitrates from water.

20 Claims, 3 Drawing Sheets

ION EXCHANGE DEVICE FOR PURIFYING WATER, PROCESS FOR MANUFACTURING IT AND ITS USE FOR REMOVING NITRATES AND/OR NITRATES FROM WATER

DESCRIPTION

The present invention relates to an ion exchange device for purifying water or for improving the quality of water, preferably for decreasing its nitrite and/or nitrate content, comprising at least one exchange container with a basic anion exchanger in chloride or sulfate form arranged therein. The invention further relates to a process as well as the use of the ion exchange device for producing drinking water.

The problem of the increase of the nitrate and nitrite ion concentrations in drinking water has become very important in recent years. Since dangerous, carcinogenic nitrosamines can be formed in the human body from nitrates and nitrites, the maximum nitrate concentration in drinking water is being prescribed by law in many countries through drinking water standards. Nevertheless, the nitrate concentration in natural water sources continues to increase because nitrates accumulate in large amounts in surface waters and in ground water through various forms of harmful materials, particularly through overuse of fertilizers on agricultural land. In some parts of Germany drinking water wells have already had to be closed because the nitrate concentration exceeded the legally prescribed limit of 50 ppm.

From the nutritional point of view, it is necessary to maintain the content of all ions in natural water. Therefore an increase of such ions which exhibit toxic effects in high concentrations must be avoided. In the case of nitrates, a concentration of less than 10 ppm is currently considered harmless, or even desirable, however the toxicity increases substantially at higher concentrations and endangers in particular small children.

Thus, particularly with small children, numerous cases have been described in the medical literature in which water with a high nitrate content, for example as water for diluting infant formula, has caused serious damage in infants. Furthermore, other types of damage (Damage to blood chemistry and the like) have been observed. Finally, the presence of nitrates and/or nitrites in water is also undesirable for many commercial industries.

In view of this state of affairs, various nitrate removal processes have been developed in water processing, for example biological removal using denitrifying bacteria as well as the use of anion exchange resins, particularly with special functional groups, which act specifically on nitrate ions.

The first method is unsuitable for producing limited amounts of drinking water in simple apparatus for household purposes. The second process has the following disadvantage: when water which contains various anions such as chloride, sulfate, nitrate, carbonate and phosphate, is conducted through the known anion exchange resins, then the sorption of the individual ions varies in accordance with the ion affinity of the exchange resin, and one obtains a filtrate with a completely changed ion content. From the nutritional viewpoint and in view of the toxicity, only a removal or decrease of the nitrate ion content is purposed by the present invention, whereby the concentration of the remaining ions in the original water remains substantially unchanged or is only changed to a certain extent. Some known ion exchange resins, which have a particular affinity for nitrate ions, nevertheless strongly affect the chloride, sulfate and carbonate concentrations.

Basic anion exchange resins can be obtained in chloride, sulfate and hydroxyl forms. The use of each individual type alone leads not only to removal of nitrate ions, but also to substantial changes in the concentrations of the remaining anions.

Therefore, a process for removing nitrates from water using strongly basic anion exchangers has been suggested in German published application No. DE 30 10 538 in which the water to be processed is brought into contact with a layer of strongly basic anion exchange material whose functional groups have been converted 50 to 100% into the sulfate form, 0 to 50% in the chloride form, and 0 to 50% in the hydrogen carbonate form, so that the basic ion exchanger exists either in 100% sulfate form or in a mixed sulfate/chloride and/or hydrogen carbonate form.

However, this process has the disadvantage that the filtrate may substantially exceed or fall short of the limits prescribed in the drinking water regulations for chlorides and sulfates, depending on the rate at which the water flows through the anion exchange material.

The goal and object of the present invention was therefore to find an improved ion exchange device for purifying water or improving water quality as well as a process for its manufacture. In particular, within the scope of the present invention, it is to be possible to decrease the nitrite and/or nitrate content of the water to be purified, without substantially increasing the chloride and/or sulfate content of the water. Furthermore, it should be possible to easily treat small amounts of water, for example for household use.

In accordance with the invention it has been determined that these goals and objects are met by an ion exchange device for water purification or for improving water quality, preferably for decreasing the nitrite and/or nitrate content, comprising at least one exchange container with a basic anion exchange material in chloride and/or sulfate form arranged therein. In accordance with the invention the ion exchange device additionally contains at least one basic anion exchange layer in hydroxyl form or a hydroxyl group-containing layer; the anion exchange material layers are arranged in succession either directly and/or with interposition of intermediate layers, filter layers or anion exchange containers, and the anion exchange material layer(s) in chloride and/or sulfate form is(are) not arranged in mixed form, but in separate layer(s).

In accordance with a preferred embodiment of the invention, at least one filter layer, preferably an activated carbon layer or activated carbon-containing layer, is arranged in the ion exchange device following the inlet opening.

According to another preferred embodiment the at least two successively arranged basic anion exchange material layers, at least one of which is a basic anion exchange layer in hydroxyl form or a hydroxyl group-containing anion exchange layer, are arranged as separate layers without intermixing in the ion exchange container, which preferably is a cylindrical, frustoconical or elliptical cross-section container. At or in the vicinity of the inlet opening is an activated carbon layer or activated carbon-containing layer, which preferably contains a finely divided plastic or a finely divided synthetic resin. The plastic is preferably selected from the group of polyolefins or fluoropolymers.

By means of the ion exchange device of the invention with the anion exchange layer it is possible to fulfill the conditions required for a process suitable for selectively removing nitrates from water, especially drinking water. Through the use of preferably a simple cartridge or a similar ion exchange device, which contains the two unmixed layers of basic anion exchange material, it is also possible to carry out the removal of nitrates for households, for smaller commercial installations, for well water, e.g. in agricultural operations or for households.

According to one embodiment the first anion exchange layer at or in the vicinity of the water inlet opening or the first layer in the direction of passage of the water is a weak, medium strength or strongly basic anion exchange resin layer in hydroxyl form, preferably a weakly basic anion exchange resin layer in hydroxyl form, and in contrast the second layer arranged in the direction of passage of the water is a strongly basic anion exchange resin layer in sulfate form or in chloride form, preferably however in sulfate form.

According to the preferred embodiment of the ion exchange device of the invention, however, the chloride and/or sulfate ion-containing anion exchange layer(s) or anion exchange layer in chloride or sulfate form, which may be weakly, medium strongly or strongly basic, preferably strongly basic, is/are arranged in the ion exchange device in the vicinity of or underneath the inlet opening, preferably underneath a filter layer, and/or (in the direction of flow of the water to be purified) in front of the anion exchange layer in hydroxyl form or the hydroxyl group-containing anion exchange layer. The anion exchange layer in hydroxyl form is strongly, medium strongly, or weakly basic, preferably weakly basic, and/or has a decreased layer thickness compared to the layer thickness of the other anion exchange layers.

With this simple, but previously unknown, arrangement of different functional forms of basic ion exchanger, very good or nearly ideal results are achieved.

This ion exchange device according to the invention is suitable for a broad spectrum of waters, well waters, tap waters and the like used for producing drinking water. Since in many areas the water has a very high chloride content, the anion exchange resin arranged first in the direction of passage of the water is preferably an ion exchange resin in sulfate form. However, if strong sulfate contamination is present, an anion exchange resin in chloride form is utilized. For water very strongly contaminated with chloride and sulfate ions, it is possible in accordance with one embodiment to include an anion exchange resin in chloride form and an anion exchange resin in sulfate form in different layer arrangements of one or more separate layers preceding the basic anion exchange resin in hydroxyl form.

According to a preferred embodiment, the anion exchange layer in hydroxyl form arranged in the ion exchange device is weakly basic. This makes it possible that the pH value of the water will hardly be changed or will only change within a very narrow range.

According to a further preferred embodiment the weakly basic anion exchange layer in hydroxyl form or the weakly basic hydroxyl group-containing anion exchange layer contains up to more than 50%, preferably more than 65%, tertiary amino groups and/or hydroxyl and chloride groups (OH/Cl) These anion exchange resins have produced very good results within the scope of the invention with respect to the selective removal of nitrate and/or nitrite ions.

According to another preferred embodiment of the invention, the anion exchange layer in hydroxyl form is weakly, medium strongly, or strongly basic, whereby however, the volume and/or weight ratio of the medium strongly or strongly basic anion exchange layer in hydroxyl form to that of the other strongly basic anion exchange layer(s) in chloride and/or sulfate form is from 0.05:1 to 0.8:1, preferably 0.1:1 to 0.6:1.

According to another preferred embodiment the volume ratio and/or the weight ratio when using weakly basic to medium strongly basic anion exchange layer(s) in hydroxyl form to strongly basic anion exchange layer(s) in chloride and/or sulfate form is from 0.3:1 to 0.9:1, preferably 0.4:1 to 0.7:1.

According to a preferred embodiment of the invention the ion exchange device, preferably a cylindrical or cylinder-like ion exchange container, is provided with a thread, a projection or a mount or similar attaching, holding or mounting device and has a diameter from 0.5 to 25 cm, preferably 0.7 to 18 cm, as well as a height (or length) of 4 to 25 cm, preferably 5 to 20 cm, whereby preferably the height (or length) of the device is larger than the radius or average diameter. Cartridges or similar cylindrically formed ion exchange containers having a diameter from 1 cm to 8 cm, preferably 1.5 to 6 cm, and a length which is more than 2.5 times, preferably more than 3 times, as large as the cartridge radius, are particularly preferred. It is especially preferred for the length of the cartridges to be 2.5 to 20 cm, preferably 4 to 12 cm. The latter sizes represent small ion exchange devices for smaller amounts of water.

According to a preferred embodiment, the finely divided plastic which is contained in the filter layer, preferably an activated carbon layer, has a mean particle diameter of from 0.01 to 100 $\mu$m, preferably 0.1 to 30 $\mu$m.

The present invention further relates to a process for producing the ion exchange device for water purification or for improving water quality, preferably for decreasing the nitrite and/or nitrate content, comprising at least one ion exchange container with a basic anion exchange material in chloride and/or sulfate form contained therein. In accordance with the invention a basic anion exchange layer in hydroxyl form or a hydroxyl group-containing layer is additionally introduced into to the ion exchange container, which preferably is a cylindrical, frustoconical or elliptical cross-section container, the ion exchange layers are arranged directly one after the other while avoiding mixing of the layers and/or with interposition of intermediate layers, filter layers or anion exchange containers for avoiding mixing of the layers, so that the anion exchange layer(s) in chloride and/or sulfate form are not mixed, but instead are arranged as separate layers.

According to a preferred embodiment of the process of the invention, an activated carbon layer or an activated carbon-containing layer, preferably an activated carbon layer containing finely divided plastic, is introduced first with reference to the direction of flow of the water to be purified at or in the vicinity of the water to be purified; the chloride and/or sulfate containing anion exchange layer(s) or anion exchange layer in chloride and/or sulfate form is introduced either directly thereafter or with interposition of intermediate layers, filter layers or anion exchange containers, and the anion exchange layer in hydroxyl form or the hydroxyl group-containing anion exchange layer is introduced either directly thereafter or with interposition of intermediate layers, filter layers or anion exchange containers, whereby the introduction of the layers preferably is carried out in this order or in the opposite order.

In the filling of the ion exchange device, at least one anion exchange material, preferably the basic hydroxyl group-containing anion exchange material and/or the basic sulfate group-containing anion exchange material is preferably introduced into the ion exchange container in a moistened condition or in wet condition to form separate layers, or at least one ion exchange material is moistened after being introduced to form separate layers. The other anion exchange material(s) is(are) thereafter introduced to form separate layers.

According to a preferred embodiment the ion exchange device comprises at least two ion exchange containers which are or can be connected in succession. Preferably the basic anion exchange material layer in hydroxyl form or the basic hydroxyl group-containing anion exchange material layer is disposed in the last ion exchange device (with respect to the direction of flow of the water to be purified), while the basic ion exchange material in chloride and/or sulfate form is arranged in at least one separate layer in at least one preceding anion exchange device in the sequence, preferably in at least one immediately preceding ion exchange device. When several successively connected ion exchange containers are used, they are preferably formed so that they can be inserted into each other, or screwed, connected or attached onto each other, preferably through conical tapering of the cylindrical outlet or inlet openings, through conical expansion or extension of the cylindrical inlet or outlet openings, or through attachment, forming, or securing connecting elements, threads, plugs, or the like.

The moistening or wetting of the anion exchange material before introduction into the ion exchange container is carried out with non-infectious or distilled and/or sterilized liquid, preferably with sterile or distilled water.

The regeneration of the anion exchange material in hydroxyl form or the hydroxyl group-containing anion exchange layer or anion exchange container is preferably carried out separately from the regeneration of the basic anion exchange layers or anion exchange containers in chloride and/or sulfate form, whereby the nitrite and/or nitrate containing regeneration solution is freed of nitrite and/or nitrate by chemical or electrolytic processes, preferably by oxidation to nitrogen, and reused.

The invention further relates to the use of the ion exchange device in the form of stackable, threadedly connectable, interengaging, or otherwise connectable cartridges or similar cylindrical, frustoconical or elliptical cross-section section containers, containing at least at least one chloride- and/or sulfate-containing anion exchange layer or anion exchange layer in chloride or sulfate form arranged in the ion exchange device in the vicinity of or underneath the inlet opening, preferably beneath a filter layer, and/or in front (in the direction of flow of the water to be purified) of an anion exchange layer in hydroxyl form or a hydroxyl group-containing anion exchange layer, for removing and/or decreasing the nitrate and/or nitrite content in water to obtain drinking water.

The device can also be equipped in accordance with the embodiment described above so that it is possible to reactivate the ion exchange resins, both in hydroxyl form as well as in sulfate from or chloride form. It is then possible to treat substantially larger quantities of water.

In order to be able to produce larger amounts of drinking water with the device of the invention, a system for regenerating the hydroxyl form and the sulfate form of the basic ion exchange resins is advantageous. The cartridges which are used are inexpensive and simple to handle, so that it is possible to introduce both ion exchange resin layers successively in the same cartridge housing. Insofar as the cartridge is intended only for one-time use, the problem of bacterial growth on the nitrate saturated ion exchange resin is no problem. In larger systems, a regeneration of the hydroxyl form of the resin can be undertaken with a sodium hydroxide solution, and regeneration of the sulfate form with a sodium sulfate solution. The used regeneration solutions can be reused if they are freed of contaminants and of the eliminated nitrate. Suitable means for this are electrochemical reduction to nitrogen gas or catalytic reduction.

A preferred embodiment of the process of the invention and of the device of the invention is explained by the following description and illustrations:

FIG. 1 shows the construction of a unit consisting of a cartridge and an auxiliary filter for production of 5–10 liters of drinking water daily, an amount which, for example, is sufficient for preparing the food for a small child. Together with an arrangement for semi-quantitative nitrate/nitrite test strips, simple and absolutely reliable production of drinking water is possible, which is outstandingly suitable for feeding infants. The apparatus in accordance with the invention can also serve to denitrify strongly nitrate contaminated drinking water, which presently is found in many areas, in a simple and sure manner with the corresponding advantages compared to prior art processes.

Figure 1

A) Upper container for the water to be treated
B) Opening with the connector for the cartridge to be inserted
C) Lower container for the treated water
D) Spout
E) Cartridge
F) Layer of activated carbon and powdered polyamide
G) Layer of strongly basic anion exchange resin in sulfate form
H) Layer of weakly basic anion exchange resin in hydroxyl form
I) Support
J) Filter disk of large-pore acetate film
K) Support
L) Outlet opening.

The device is simple and inexpensive. As an example, specifications are given for a cartridge which is intended for treating from 5 to 10 liters of well water with a nitrate content of 110 ppm.:

1. Amount of resin in hydroxyl form = 5 ml
2. Amount of resin in sulfate form = 7 ml
3. Diameter of the cartridge 2 cm, Length 5 cm
4. Throughput rate = 1 liter in 10 minutes
5. Decrease in the nitrate content = 98%
6. Increase in the sulfate content = 8%

7. Decrease in the chloride content = 2%
8. The total hardness is only slightly decreased. With the same cartridge 5 to 10 liters of water can also be treated.
9. Nitrites, chlorinated hydrocarbons, and pesticides are likewise decreased.

Figure 2:
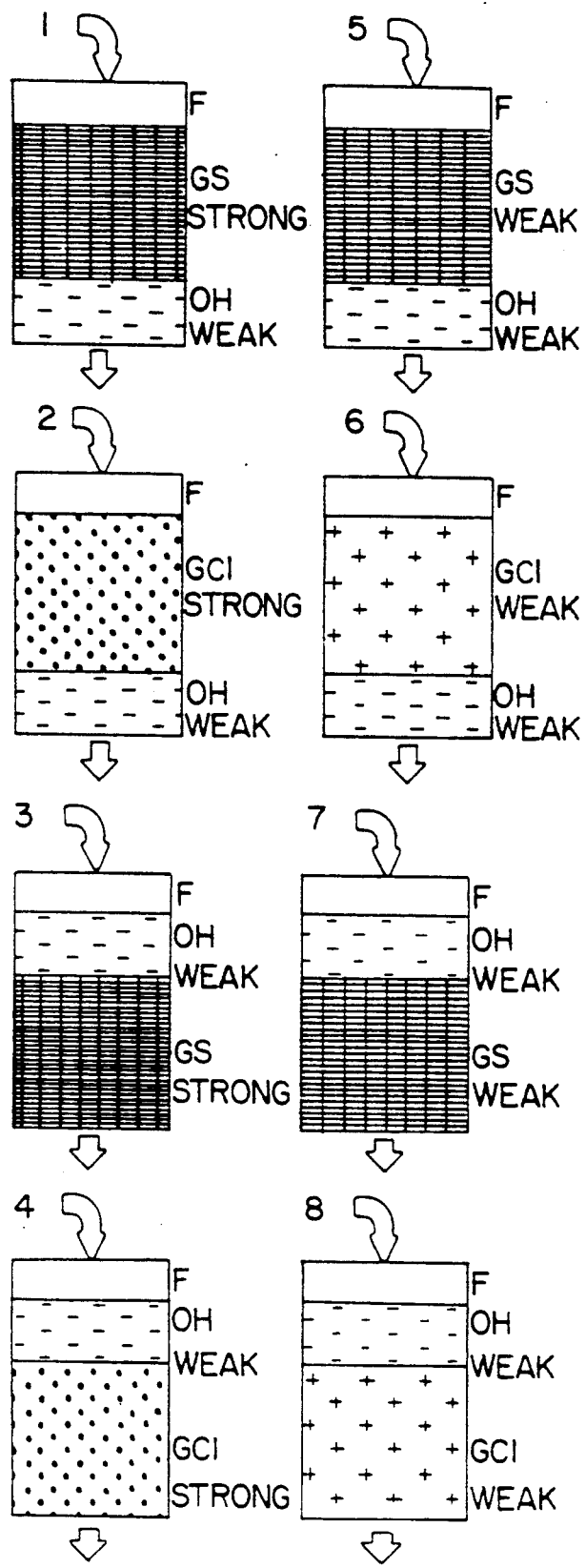
Figure 2:
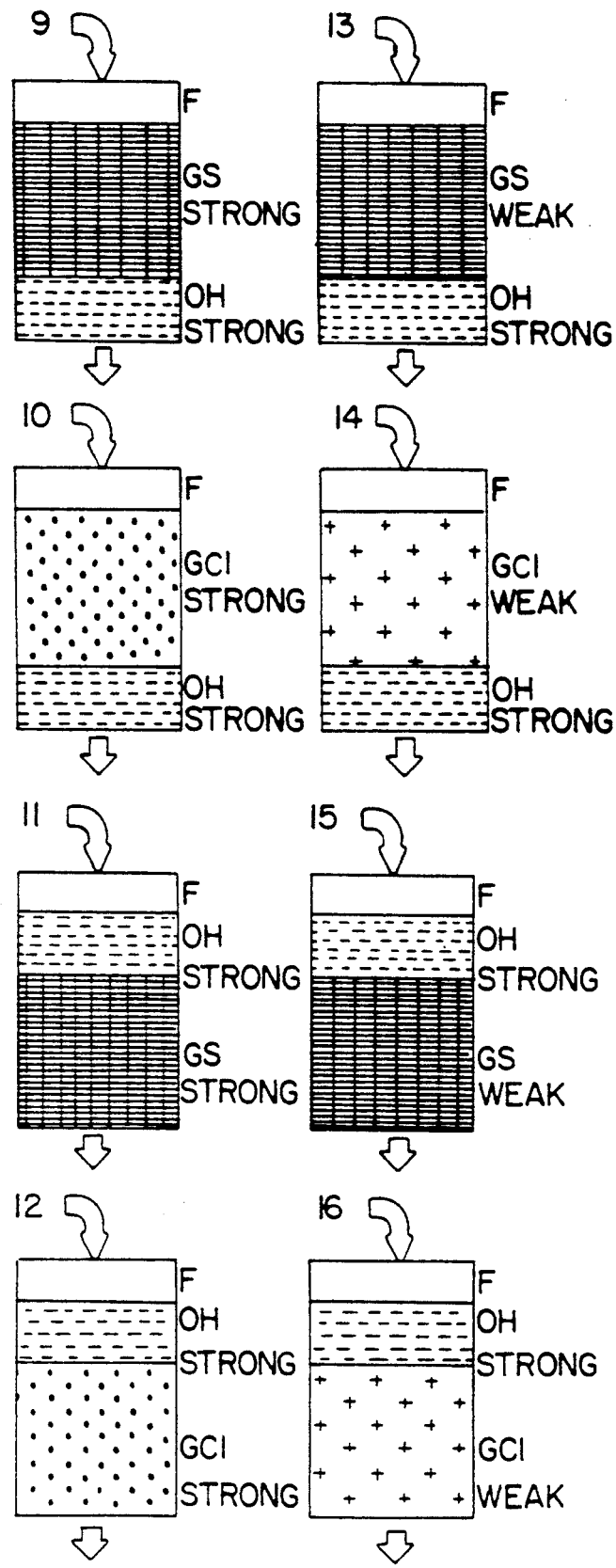

FIG. 2 schematically illustrates some working examples of the ion exchange device of the invention for purifying drinking water, whereby the ratios of layer thicknesses in the illustrations do not correspond exactly to the layer thicknesses to be selected.

The basic anion exchange layer in sulfate form is designated by GS; the basic anion exchange layer in chloride form is designated by GCl, whereby it is also indicated whether the anion exchange layers are strongly basic (strong) or weakly basic (weak).

The basic anion exchange layer in hydroxyl form is designated by OH, and the activated carbon layer is designated by F.

The anion exchangers in accordance with arrangements 3, 4, 7, 8, 11, 12, 15, and 16 are usable for special cases. The anion exchangers according to arrangements 1, 2, 5, 6, 9, 10, 13 and 14 are, however, preferred.

I claim:

1. An ion exchange device for selectively decreasing the nitrite and nitrate content of water, said device comprising at least one exchange container containing first and second basic anion exchange layers, said first anion exchange layer being selected from the group consisting of basic anion exchange material in chloride form, basic anion exchange material in sulfate form, and a combination of separate sublayers of basic anion exchange material in chloride and sulfate form, and said second basic anion exchange layer being selected from the group consisting of basic anion exchange material in hydroxyl form and hydroxyl group-containing anion exchange material, wherein said second basic anion exchange layer is a weakly basic material selected from the group consisting of anion exchange materials containing more than 50% tertiary amino groups and anion exchange materials containing mixed hydroxyl groups and chloride groups.

2. An ion exchange device according to claim 1, wherein at least one intermediate filter layer is interposed between said first and second basic anion exchange layers.

3. An ion exchange device according to claim 1, wherein said first basic anion exchange layer directly precedes said second basic anion exchange layer.

4. An ion exchange device according to claim 1, wherein an activated carbon-containing filter layer is provided preceding said first basic anion exchange layer.

5. An ion exchange device according to claim 4, wherein said activated carbon-containing filter layer contains finely divided plastic particles selected from the group consisting of polyolefins and fluoropolymers.

6. An ion exchange device according to claim 5, wherein said plastic particles have a mean particle diameter of 0.01 to 100 μm.

7. An ion exchange device according to claim 1, wherein said first and second basic anion exchange layers are arranged such that water flowing through said device passes first through said first layer and subsequently through said second layer.

8. An ion exchange device according to claim 1, wherein said second basic anion exchange layer is weakly basic.

9. An ion exchange device according to claim 1, wherein said second basic anion exchange layer is a weakly basic anion exchange material containing more than 65% tertiary amino groups.

10. An ion exchange device according to claim 1, wherein said second basic anion exchange layer is a medium strongly or strongly basic anion exchange material and said second and first basic anion exchange layers, respectively, are present in a volume ratio of 0.05:1 to 0.8:1.

11. An ion exchange device according to claim 10, wherein said second and first basic anion exchange layers are present in a volume ratio of 0.1:1 to 0.6:1.

12. An ion exchange device according to claim 1, wherein said second basic anion exchange layer is a weakly basic anion exchange material and said second and first basic anion exchange layers, respectively, are present in a volume ratio of 0.3:1 to 0.9:1.

13. An ion exchange device according to claim 12, wherein said second and first basic anion exchange layers are present in a volume ratio of 0.4:1 to 0.7:1.

14. A process for producing an ion exchange device for selectively removing nitrate and nitrite from water, said process comprising providing separate first and second anion exchange layers in a suitable ion exchange container, said first basic anion exchange layer being selected from the group consisting of basic anion exchange material in chloride form, basic anion exchange material in sulfate form, and a combination of separate sublayers of basic anion exchange material in chloride and sulfate form, and said second ion exchange layer being selected from the group consisting of basic anion exchange material in hydroxyl form and hydroxyl group-containing anion exchange material, wherein said second basic anion exchange layer is a weakly basic material selected from the group consisting of anion exchange materials containing more than 50% tertiary amino groups and anion exchange materials containing mixed hydroxyl groups and chloride groups.

15. A process according to claim 14, wherein an activated carbon-containing filter layer is provided in said container arranged such that water flowing through said container first flows through said filter layer and thereafter through said first and second basic anion exchange layers.

16. A process according to claim 14, wherein the ion exchange material of at least one of said first and second anion exchange layers in the container is moistened or wet, and the ion exchange material of the other of said first and second anion exchange layers is thereafter introduced into the container to form a separate layer.

17. A process according to claim 16, wherein an anion exchange material selected from the group consisting of the basic hydroxyl group-containing anion exchange material of the second anion exchange layer and the basic sulfate group containing anion exchange material of the first anion exchange layer is moistened or wet with sterile water prior to introduction into the container.

18. A process according to claim 14, wherein the ion exchange device comprises a series of at least two ion exchange containers arranged such that water flows in a given direction first through one and then through another of said containers, and said second basic anion exchange layer is provided in a downstream one of said containers while said first basic anion exchange layer is provided in a preceding anion exchange container in the direction of water flow.

19. A method of selectively removing nitrate and nitrite from water comprising the steps of passing the water through first and second basic anion exchange layers, said first anion exchange layer being selected from the group consisting of basic anion exchange material in chloride form, basic anion exchange material in sulfate form, and a combination of separate sublayers of basic anion exchange material in chloride and sulfate form, and said second basic anion exchange layer being selected from the group consisting of a basic anion exchange material in hydroxyl form and a hydroxyl group-containing anion exchange material, wherein said second basic anion exchange layers is a weakly basic material selected from the group consisting of anion exchange materials containing more than 50% tertiary amino groups and anion exchange materials containing mixed hydroxyl groups and chloride groups, whereby nitrate and nitrite are removed from the water to produce water of improved drinking quality.

20. A method according to claim 19, wherein the water is first passed through an activated carbon-containing filter, then through said first basic anion exchange layer, and thereafter through said second basic anion exchange layer.

* * * * *